W. CARPENTER,
Assignor to THE NATIONAL SEWING MACHINE CO., Limited.
Button-Hole Attachment for Sewing-Machines.
No. 8,825. Reissued July 29, 1879.
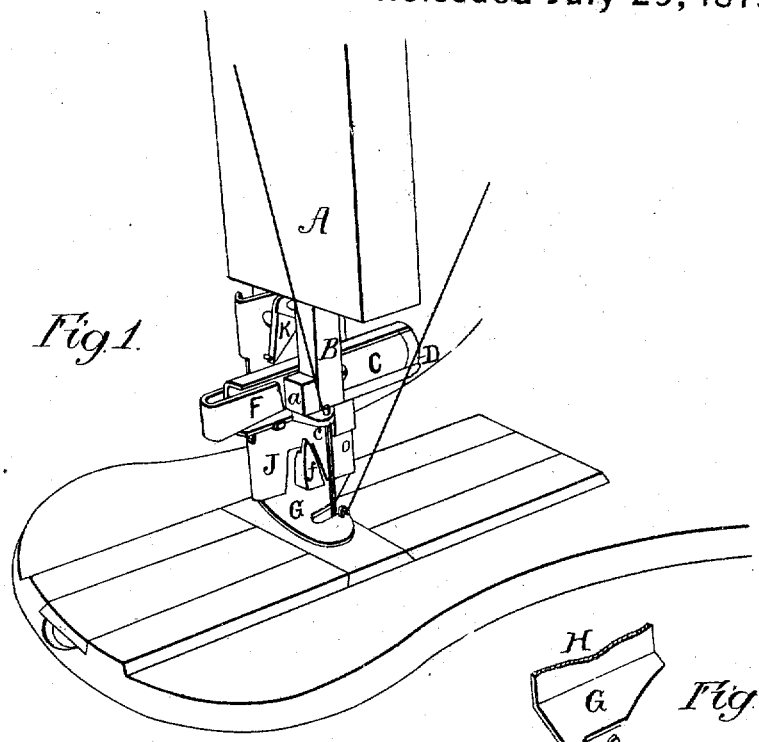
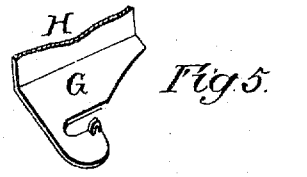
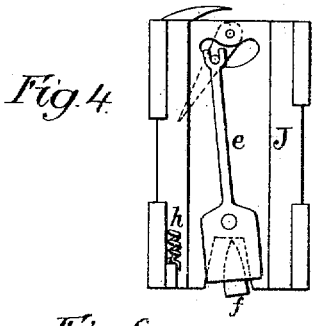
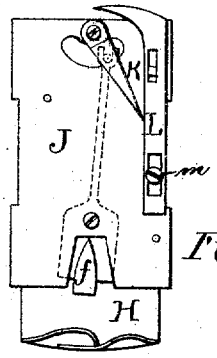
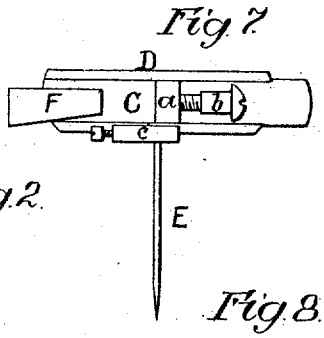
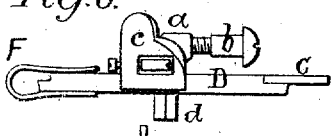
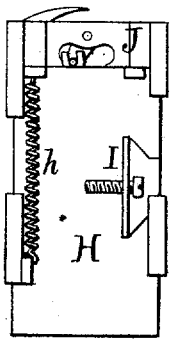
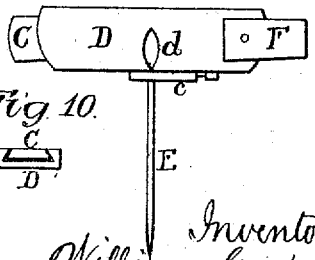
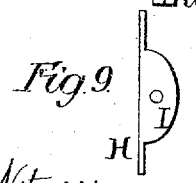
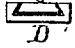
Witnesses
Henry Howson Jr.
Harry Smith
Inventor:
William Carpenter
by his Attorneys
Howson & Sons

UNITED STATES PATENT OFFICE.

WILLIAM CARPENTER, OF OLATHE, KANSAS, ASSIGNOR TO THE NATIONAL SEWING MACHINE COMPANY, (LIMITED,) OF PHILADELPHIA, PENNSYLVANIA.

IMPROVEMENT IN BUTTON-HOLE ATTACHMENTS FOR SEWING-MACHINES.

Specification forming part of Letters Patent No. 95,320, dated September 28, 1869; Reissue No. 8,825, dated July 29, 1879; application filed June 5, 1879.

*To all whom it may concern:*

Be it known that I, WILLIAM CARPENTER, formerly of Fairbury, in the county of Livingston, and in the State of Illinois, but now of Olathe, Johnson county, Kansas, have invented certain new and useful Improvements in Button-Hole Attachments for Sewing-Machines; and I do hereby declare that the following is a full, clear, and exact description thereof.

My invention is intended particularly as an improvement upon the Singer sewing-machine; and consists in giving to the needle a reciprocating motion on the needle-bar, as well as a vertical motion with said needle-bar, whereby I am enabled to make button-holes, overseam, embroider, &c. This I accomplish by attaching the needle to a slide which moves on a plate that is secured to the lower end of the needle-bar, said slide, to which the needle is attached, obtaining its reciprocating motion from a vibrating finger mounted upon an adjustable plate attached to the presser-foot or its attachments.

In order to enable others skilled in the art to which my invention appertains to make and use the same, I will now proceed to describe its construction and operation, referring to the annexed drawings, in which—

Figure 1 is a perspective of the head of a sewing-machine with my device attached to the same. Fig. 2 is a front view of the adjustable plate with the vibrating or reversible finger that operates the needle, all attached to the presser-foot connecting-plate. Fig. 3 is a rear view of the presser-foot connecting-plate, showing the manner of attaching the adjustable plate to the same. Fig. 4 is a rear view of the adjustable plate, the front of which is shown in Fig. 2. Fig. 5 is a perspective of the presser-foot. Fig. 6 is a bottom view of the slide to which the needle is attached, and the stationary plate on which the same slides. Fig. 7 is a front view, and Fig. 8 is a rear view, of the same. Fig. 9 is a side view of the presser-foot connecting-plate, and Fig. 10 is an end view of Fig. 7.

A represents the head of a sewing-machine, through which the needle-bar B reciprocates vertically.

To the lower end of said needle-bar B, on the rear of the same, is secured a plate, C, at right angles to the needle-bar. This plate C is, on its front side, about the center, provided with a projection, *a*, through which a screw, *b*, passes, said screw also passing through the lower end of the needle-bar, thus firmly securing the plate C to the needle-bar B.

On the rear side of the plate C is placed a grooved bar, D, the groove in the same being of such size as to admit the plate C, and thus form a dovetailed slide, which can easily be moved back and forth on the stationary plate C.

On the under side of the slide D is a projection, *c*, which extends forward, and in which the needle E is firmly secured in any suitable manner.

At one end of the slide D is secured a spring, F, which is bent forward and inward, and bears against the plate C, so as to hold the slide D in whatever position it may be moved.

On the rear side of the slide D is a cam or projection, *d*, as seen in Figs. 6 and 8.

The usual presser-foot in the Singer sewing-machine I dispense with, and use another presser-foot, G, of any suitable construction, said presser-foot being provided with a vertical plate, H, having an ear, I, on its rear side, by means of which it is firmly secured to the presser-bar. A screw passing through said ear into the presser-bar accomplishes this fully.

On the front side of the presser-foot connecting-plate H is placed another plate, J, the sides of which are turned so as to form clasps, fitting around the edges of the plate H, which allow the plate J to slide up and down on the same. The inner or rear side of the plate J is grooved or cut out, so as to form a vertical recess its entire length from top to bottom. In this recess is pivoted a rod, *e*, having an enlarged plate at its lower end, as seen in Fig. 4, from which a cam-shaped projection, *f*, extends forward through a slot in the lower end of the plate J.

The upper end of the rod *e* is forked, and embraces a pin on the rear side of a finger, K, which is pivoted in the center at the upper end on the front side of the plate J, said plate having a suitable curved slot, through which the pin mentioned extends toward the rear.

The plate J being constructed and attached in the manner set forth, and so that the pivot-points of the finger K and rod *e* are exactly on a line in rear of the vertical line of motion of the needle-bar, the operation for giving the needle its reciprocating motion will be readily seen.

Supposing the finger K and projection *f* are in the position represented in Fig. 2, then, when the needle-bar moves upward, the projection *d* on the slide D, to which the needle is attached, will strike the finger K, and the side of this finger, being an inclined plane, will cause the slide D, with the needle, to be moved a certain distance on the plate C to the left. Then, when the needle-bar descends again, the said projection *d* will strike the projection *f* on the left side, and cause said projection *f* to move to the right. This reverses the position of the finger K, so that at the next upward stroke of the needle-bar the projection *d* will come on the right side of said finger, and cause the slide D, with the needle, to move the same distance back to the right again, and so on. At every upward stroke the needle is changed, and at every downward stroke the device by which the change of the needle is effected is placed in proper position to make such change.

The plate J is held in position on the plate H in the following manner: On the rear side of the plate H, at the upper edge, is attached a spiral spring, *h*, the lower end of which is secured to the lower rear edge of the sliding plate J, by which means said sliding plate is at all times pressed up against the head of the machine; but if the plate J were at all times in exactly the same position, then as the needle is always raised to the same height the stitch would be of the same length, because the needle would at all times shift the same distance.

To avoid this, and to enable the operator to make any sized stitch, I attach to the plate J an adjustable bar, L, which can be moved up and down on said plate and fastened at any point desired by a screw, *m*. This bar L is at its upper end bent inward, as seen in Fig. 2. If this bar L is placed so as not to extend above the plate J, the upper edge of said plate will be pressed against the head of the machine, and the finger K will be raised to its highest point.

As the needle-bar is always raised to the same height, the projection *d* will only follow the inclined side of the finger for a short distance, and consequently the needle is moved only a very short way to the right or left; but in proportion as the bar L extends above the plate J the finger K is lowered, and consequently the projection will have a proportionately greater distance to follow the inclined side of the finger, and hence the needle will be moved a greater distance to the right or left.

Although this device is particularly intended to be used in connection with a Singer sewing-machine, it may be used with any other, in which case it will have to be slightly modified to suit the same.

Having thus fully described my invention, what I claim as new, and desire to secure by Letters Patent, is—

1. The combination of a needle-bar, a slide carrying the needle and carried by the bar, a reversible finger, means for supporting said finger, and devices, substantially as described, whereby the position of the said reversible finger is governed by the transverse movements of the slide.

2. The combination of a needle-bar, a needle-carrying slide on said bar, a vibrating finger, means for supporting said finger, a rod or lever controlling said finger, and devices, substantially as described, whereby the said rod or lever is caused to effect the reversal of the finger, all substantially as specified.

3. The combination of the needle-bar, having a plate, C, the needle-carrying slide adapted to said plate, and the spring F, all substantially as set forth.

4. The combination of the needle-bar, needle-carrying slide, having a projection, *d*, with the presser-bar, and a plate carried by the presser-bar and carrying the reversible finger K, and pivoted rod *e*, having a projection, *f*, all substantially as set forth.

5. The combination of the needle-bar, the needle-carrying slide, the reversible finger K, the presser-bar and plate J, carrying said finger, and devices, substantially as described, by which said plate may be adjusted vertically on said presser-bar.

6. The combination of the head of the machine with the presser-bar, plate H, a plate, J, carrying a reversible finger, K, the bar L, its adjusting-screw, and a spring, *h*, all substantially as described.

7. The combination of the recessed plate H with the plate J and the rod *e*, as specified.

In testimony whereof I have signed my name to this specification in the presence of two subscribing witnesses.

WILLIAM CARPENTER.

Witnesses:
JOHN T. BURRIS,
JOHN T. LITTLE.